Figure 1:
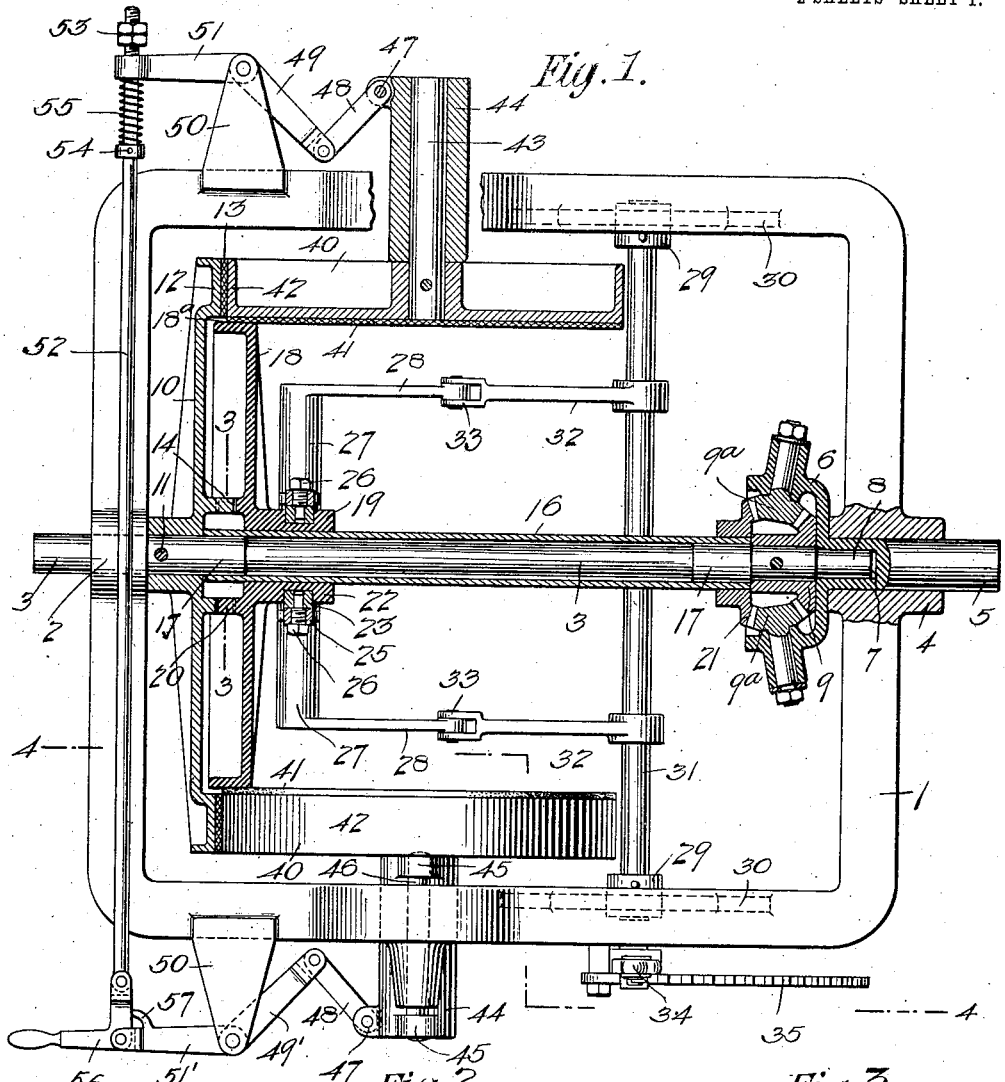

No. 893,144. PATENTED JULY 14, 1908.
H. CASLER.
VARIABLE SPEED POWER TRANSMISSION MECHANISM.
APPLICATION FILED APR. 24, 1907.

2 SHEETS—SHEET 1.

Witnesses:
Raphael Netter
A. S. Dunham

H. Casler
Inventor

By his Attorneys,
Kerr, Page & Cooper

No. 893,144. PATENTED JULY 14, 1908.
H. CASLER.
VARIABLE SPEED POWER TRANSMISSION MECHANISM.
APPLICATION FILED APR. 24, 1907.
2 SHEETS—SHEET 2.
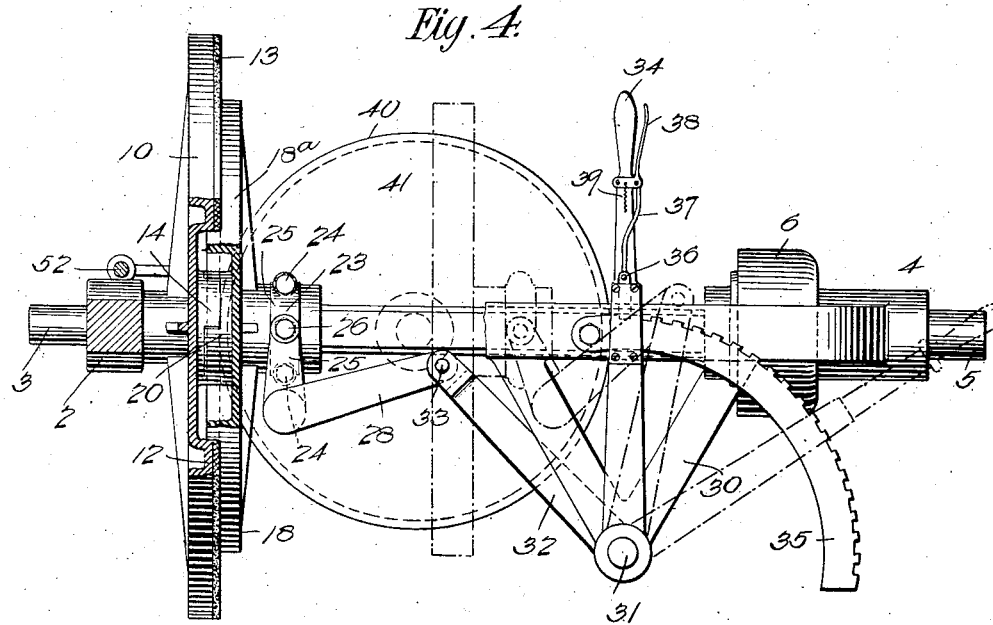
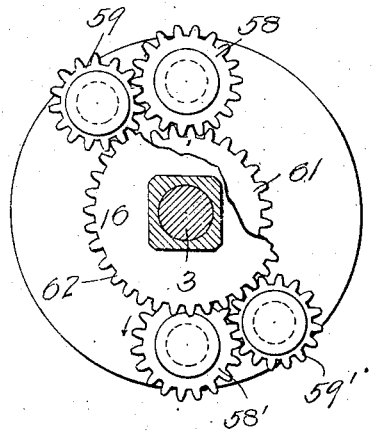
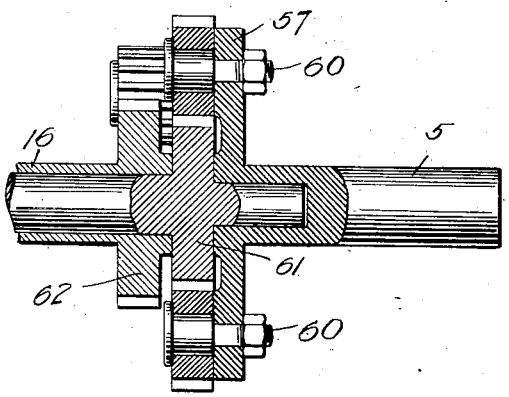
Witnesses
Raphael Netter
A. S. Dunham
H. Casler
Inventor
By his Attorneys
Kerr, Page & Cooper

UNITED STATES PATENT OFFICE.

HERMAN CASLER, OF CANASTOTA, NEW YORK.

VARIABLE-SPEED POWER-TRANSMISSION MECHANISM.

No. 893,144.　　　　Specification of Letters Patent.　　　　Patented July 14, 1908.

Application filed April 24, 1907. Serial No. 369,998.

*To all whom it may concern:*

Be it known that I, HERMAN CASLER, a citizen of the United States of America, residing at Canastota, in the county of Madison and State of New York, have invented certain new and useful Improvements in Variable-Speed Power-Transmission Mechanism, of which the following is a specification.

My invention relates to new and useful improvements in variable speed power transmission mechanism, and the primary object of the invention is to devise a mechanism of the character referred to which will be extremely simple in construction and at the same time of great durability and efficiency in use, and which will permit of power with a wide range of speed being transmitted from a driving to a driven element.

A further object is to provide a mechanism in which the driven element may be operated to rotate in either direction by the operation of the same elements which accomplish the different changes of speed, and without the employment or interposition of any special reversing mechanism.

It is well known in the art to which the invention appertains, that there are many different forms of change speed mechanisms which are more or less satisfactory in use, but which owing to the complicated nature of their structure, are at times uncertain in operation and call for frequent adjustment and repair owing to the tendency of their parts becoming deranged or broken as the result of the heavy strains, to which the mechanisms are subjected. At the present time the most efficient forms of speed transmission, and the forms most generally in use, *i. e.* the slidable gear, and interchangeably locked gear, are attended with innumerable difficulties which greatly impair their efficiency and constantly call for attention on the part of the operator, chief among the objectionable features being the liability of the gears becoming stripped of their teeth when subjected to heavy loads, in which case new gears must be supplied; their tendency at times to stick or jam and fail to act promptly when operated, and finally the limitation of speed variation to the number of speed gears employed which in most cases is necessarily small owing to their weight and amount of space they occupy.

In the embodiment of my invention, forming the subject matter of this application, I have devised a mechanism which in a great measure overcomes all of the objectionable features attending the known devices as above set forth. Instead of employing a plurality of speed gears, I dispense with the same and employ friction elements for transmitting movement from a driving shaft, as the engine shaft of a motor vehicle, to the driven element, said friction elements being arranged and operating in a novel and improved manner, and provide means by which the relative position of said friction elements may be varied manually at the will of the operator to attain the speed desired for the driven shaft and also to reverse the direction of rotation thereof.

The invention consists broadly and generally in the improved mechanism to be fully described hereinafter and the novelty of which will be particularly pointed out and distinctly claimed.

Figure 2:
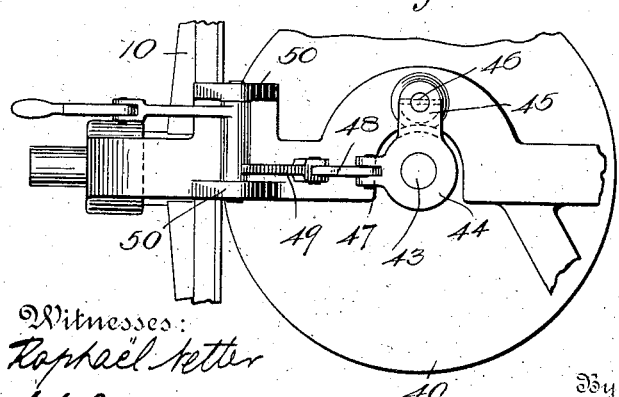
Figure 3:
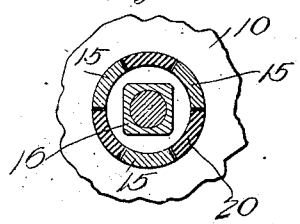

I have fully and clearly illustrated a preferred embodiment of my invention in the accompanying drawings to be taken as a part of this specification and wherein Figure 1 is a plan view partly in section of a structure illustrative of my invention. Fig. 2 is an end elevation in detail of a bearing and operating parts associated therewith, employed in connection with the invention. Fig. 3 is a detailed sectional view on the line 3—3 of Fig. 1. Fig. 4 is a sectional view on the line 4—4 of Fig. 1. Figs. 5 and 6 are views illustrative of a modified form of differential or back gearing employed in connection with the invention.

Referring to the drawings by numerals of reference. 1 designates a rigid supporting frame upon which the several parts of the transmission mechanism are arranged and operate. This frame is shown as being rectangular in form, and may be of any structure suitable to the purpose for which it is employed.

One of the side bars of the supporting frame 1 is provided with a bearing 2, through which projects, and has bearing, a power shaft 3, said shaft being driven in any suitable manner, as for instance, by the combustion engine of a motor vehicle. Located on the cross-bar opposite to the one provided with the bearing 2, is a bearing 4 said bearings being in alinement, and in said bearing 4 is journaled a driven shaft or spindle 5 carrying at its inner end a gear box or casing 6, to be described with its inclosed parts hereinafter. In said spindle within the gear box is a socket 7 which receives the inner end 8 of the power shaft 3, said socket forming a bearing for the inner end of the power shaft, the arrangement being such that said shafts may turn relative to each other. Mounted on the shaft 3 to turn therewith, and located within the box or casing 6, is a beveled pinion 9 arranged in mesh with a plurality of radially disposed beveled pinions 9ª journaled in the said gear box or casing and coöperating therewith in a manner to be presently set forth.

Rigidly connected with the shaft 3, to rotate therewith is a friction disk 10, secured to said shaft by a cross pin 11 or by any other efficient means. This friction disk 10 is provided on its inner face with an annular circumferential contacting face 12, which may or may not be covered with a friction material 13, such as leather or other suitable material. The disk 10 is formed adjacent its hub with a clutch face or element 14, of any of the well known forms, as for instance, the spaced projections 15, as shown in Fig. 3 of the drawings. As this disk 10 is rigidly mounted upon the power shaft 3, it will be understood that said disk at all times rotates at the same speed and in the same direction as said shaft, and I will now proceed to describe the means by which power at varying speeds is transmitted from said disk to the driven shaft 5.

Surrounding the power shaft 3 is a sleeve or hollow shaft 16, capable of rotation relative to said shaft and having bearing at its opposite ends upon enlargements 17 on said shaft, as shown, the ends of the sleeve respectively abutting the inner face of the disk 10, and the gear 9 whereby longitudinal movement of the sleeve is prevented. The sleeve 16 is squared on its outer surface as shown in Figs. 3 and 5 and slidably disposed thereon for movement longitudinally thereof is a friction wheel 18 the hub 19 of which is interiorly squared to receive said sleeve and to form a connection between said sleeve and wheel whereby the latter may slide thereon but rotates therewith. This friction wheel is formed with an annular peripheral contact face 18ª located adjacent to, but at right angles to the face 12 of the disk 10, and at its central portion said wheel is formed with a clutch face 20 adapted to coöperate with the clutch face 14 on the disk 10, so that when the clutch faces are interengaged rotary motion will be transmitted from the power shaft to the wheel 18 and the sleeve 16. Rigidly secured to the sleeve 16, at the end opposite to the disk wheel 18, is a beveled spur gear 21, larger than the gear 9 and arranged to mesh with the radial pinions 9ª heretofore mentioned.

The means for shifting the wheel and disk 18 longitudinally of the sleeve 16 will now be described. Formed in the hub 19 of the wheel 18 is an annular groove 22 in which is located a two-part split holding ring or collar 23, the ends of which are held together by means of bolts 24, 24, which serve to securely clamp the said ring in place. Secured to the ring 23, is a yoke frame 25, the same being secured to the ring by means of oppositely disposed screws 26, 26 as shown. This yoke frame includes oppositely disposed members 27, 27 formed with rearwardly extending arms 28, 28. Mounted in bearings 29, 29 carried by brackets or hangers 30, 30, secured to opposite frame members, is a rock shaft 31, provided with a pair of arms 32, 32, rigidly connected thereto, to turn therewith, the outer ends of said arms being pivotally connected respectively to the arms 28, 28 forming part of the yoke frame, as at 33, 33.

Carried at one end of the rock shaft 31, is a hand lever 34 and fastened to the supporting frame is a toothed quadrant 35 which passes through an opening in said lever, the latter carrying a sliding latch pin or key 36 which coöperates with the teeth of the quadrant to lock the lever in the several positions to which it may be moved. The latch pin is connected by a connecting rod 37 to an operating lever 38 fulcrumed on the hand lever, which operating lever when swung in one direction operates to lift the latch pin from engagement with the quadrant, a contractile spring 39 serving in connection with the lever 38 to urge said pin into locking position.

Referring particularly to Fig. 4 in connection with the above description, it will be seen that when the lever 34 is in the position shown, the disk 18 will be thrust toward the left so as to place the clutch faces 14 and 20 in such relation to each other that rotary motion is transmitted directly from the power shaft to said disk 18 and consequently to the sleeve 16 and gear 21 so that the latter and the gear 9 on the power shaft rotate at the same rate of speed, the radial pinions 9ª forming such connection between said gears 9 and 21 that the shaft or spindle 5, constituting the driven element is also driven at the same speed as the power shaft and in the same direction as the latter.

I will now proceed to describe the combination of elements by means of which the speed of rotation of the driven shaft is varied, and its direction of rotation reversed.

Mounted on the supporting frame, on opposite sides of the shafting, and the disk 18, are transmission disks 40, 40 by means of which rotary motion may be transmitted from the element 10 to the element 18 when the latter is uncoupled from direct connection therewith. Each of these disks 40, is formed with a frictional surface 41 to engage the peripheral face 18ª of the element 18 and with a circumferential edge contact face 42 to engage the friction surface 13 on the element 10 so that motion may be transmitted from said element 10 to the disks 40, 40 and from the latter to the disk 18 when the same is moved out of direct connection with the driving shaft.

The disks 40 40 are held in engagement with elements 10 and 18 and moved away therefrom by the following described means: The disks 40, 40 are mounted on stub shafts 43, 43 arranged to rotate in bearing boxes or sleeves 44, 44 arranged transversely of the side members of the frame, and each of which is formed with ears 45, which receive a pivot pin 46, the latter passing through an opening in the frame member, said pivot pin being arranged so that the bearing sleeve may swing thereon and also have slight movement longitudinally thereof.

Referring to Fig. 1 of the drawings it will be seen that the swinging movement referred to will permit of the bearing being moved laterally to throw the disk 40 carried thereby out of contact with the element 10 and the longitudinal movement enables said disk to be withdrawn from engagement with the face 19 of the disk 18.

The means for moving the bearing is constructed as follows:—The bearings 44 are provided with ears 47, 47 to which are pivoted at one end links 48 48, the opposite ends of which are pivoted to arms 49, 49 of bell-crank levers fulcrumed in bearings 50, 50 on the supporting frame. Passing through an opening in the other arm 51 of one of the said bell crank levers is a rod 52 having threaded onto its end a stop nut 53, and provided on the other side of the arm 51 with an abutment 54 between which and said arm is an expansive spring 55. Fulcrumed on the arm 51' of the other bell crank lever is a third bell crank lever 56, said arm 51' having a stop 57 against which the bell crank 56 abuts and by means of which its movement is limited in one direction, one arm of said bell crank 56 being connected to the lower end of the rod 52. When the bell cranks 49, 51 and 49', 51' are in the position shown in Fig. 1, the spring 55 acts to force the arm 51 away from the frame and also exerts its force on rod 52, to have a corresponding effect on the other bell crank 49', 51'. The force of the spring 55 is thus transmitted to the bearing sleeves 44, 44 by means of the links 48, 48 so as to swing said bearings toward the element 10 and thereby bring the faces 42 of the transmission disks into contact with the said element 10, and at the same time slide said bearings longitudinally on the pivot pins 46, and bring the faces 41, 41 of the said disks 40, 40 into contact with the face 18ª of the element 18.

When it is desired to throw the elements 40, 40 out of operative relation to the disks 10 and 18, the bell crank 56 is thrown downwardly which serves to bring the nut 53 into engagement with the bell crank 51 and by virtue of the connection between the lever 56 and rod 52, draws the arms 51, 51' toward each other, which movement through the links 48, 48 swings the bearings 44, 44 so as to move the transmission elements 40, 40 away from the element 10, and slides said bearings on the pivot pins to retract the elements 40, 40 from the element 18.

The construction and relative arrangement of the parts and elements being as above set forth, the operation may be stated as follows, it being first premised that the driven element 5, can be driven at the same speed and in the same direction as the power shaft, at a slower speed than said shaft and in the same direction, or it may rotate in an opposite direction to the rotation of the shaft at a slower speed. It is obvious that when the element 18 is in the position shown in Fig. 1, that is, with its clutch element 20 in engagement with the clutch 14 on the co-acting element 10, that the element 18 is driven directly from the power shaft, and consequently the sleeve 16 and driven shaft 5 rotate at substantially the same speed as the power shaft, and in the same direction as the latter. It will be understood that in the operation set forth that the friction wheels 40, 40 are entirely unnecessary for the purpose of transmitting motion from the element 10 to the element 18, although they may do so to some extent. Assuming now that it is desired to drive the element 18, spindle 16 and gear 21 through the transmission wheels 40, 40, the latter are moved, by means of the operating mechanism set forth, into position to engage the elements 10 and 18, and the latter is then moved along the sleeve 16 to such position relative to the transmission disks 40, 40 as will attain the results desired. It is apparent that in the event the element 18 is moved until its periphery is at the center of the transmission elements, the latter will have no driving effect upon said element 18 and it will not be rotated. Such being the case, the bevel gear 21 will remain stationary but the gear 9 attached to the power shaft will rotate and act to impart rotation to the bevel pinions 9ª and the latter being in mesh with the stationary gear 21, the result will be that the driven shaft or spindle 5 will be carried around by said beveled gears under the influence of the gear 9. As heretofore stated, the gear 9 is smaller than the gear 21, the proportion being substantially 5 to 6, and in the operation just set forth, the speed of the spindle 5 will consequently be somewhat less than one-half of the speed of the power shaft. With the proportions just stated, it will be apparent that the condition which would cause the driven shaft or spindle 5 to stand still while the shaft 3 is rotating will be obtained when the hollow shaft or sleeve 16 and gear 21 are rotated in the opposite direction to the power shaft at a speed of 5/6 of that of said power shaft. It will also be apparent that so long as the friction wheel 18 is between the disk 10 and the center line of the transmission disks 40, 40, that the wheel 18 will rotate in the same direction as said disk 10, and that a reversal of rotation of the disk 18 is accomplished by moving the same away from the disk 10, past the center of said transmission disks 40, 40, the speed of rotation of said disk 18 being increased in proportion to the distance it is moved beyond said center. It therefore follows that when the disk 18 is well toward the opposite side of the disks 40, 40 that it will rotate in a direction opposite to that of the disk 10 and at a speed substantially 5/6 of that of said disk, the proportion which the gears 9 and 21 bear to each other being kept in mind. Under the conditions just described that is, when the spindle or shaft 5 is stationary, we will say that the shaft 3 is rotating in one direction at the rate of six turns a minute, and the hollow shaft or sleeve 16 rotating in an opposite direction at five revolutions per minute; if the friction disk 18 is then moved away from the disk 10 to the extreme opposite side of the transmission disks 40, 40, the disk 18 will then rotate in a direction opposite to the shaft 3, and at the same speed as said shaft, but owing to the fact that the gear 21 is larger than the gear 9, the action of said gears on the pinions 9ª will be such as to rotate the driven shaft or spindle 5 in an opposite direction to the power shaft and at a slower speed than that of said power shaft.

From the above it will be seen that with the shaft 3 running at a constant speed, the spindle or driven shaft 5, may be turned at an equal speed and in the same direction as the power shaft, and that by changing the location of the friction wheel 18, the speed of the spindle can be reduced until it stands still, and that further change of location of said wheel 18 will result in a reverse motion being imparted to the spindle 5 at a speed slower than that of the shaft 3.

In Figs. 5 and 6 of the drawings I have shown a modified form of back gearing in which spur gears are employed, the operation, however, being the same as when beveled pinions are employed. In these figures the driven spindle 5 carries a plate 57 upon which are journaled four planetary gears 58, 58′ and 59, 59′, said gears being mounted on studs 60, and corresponding to the gears 9ª, previously described. The gears 59, 59′ not only mesh with gears 58, 58′, but are also long enough to extend into mesh with a gear 62 hereafter described. The driving or power shaft has formed integral therewith a spur gear 61 which is in mesh with the gears 58, 58′ and on the sleeve 16 is a spur gear 62 which meshes with the gears 59, 59′, it being understood that said gears 61, 62 bear the same proportion to each other as the bevel pinions 9, 21, that is, 5 to 6. Referring particularly to Fig. 5, it will be seen that if the driven shaft 5 is held from rotation, and the power shaft 3 is rotated to the right the gear 61 moves in the same direction turning gear 58 to the left and 58 which meshes with 59 will turn the latter to the right, and 59 meshing with gear 62 will turn it and the shaft 16 to the left. The same applies to gears 58′ and 59′, and it will be apparent that the operation and result is the same as that attained when the beveled gears are employed.

While I have shown and described a construction embodying two transmission elements 40, 40, I desire it to be understood that but one may be employed or any number greater than two as many being employed as could be accommodated in the circle concentric with disk 10. However, I might state that the two opposed elements provide an efficient structure in that one tends to counteract any side thrust which may be imparted by the other to the hollow shaft 16.

What I claim is:—

1. The combination of a driving shaft, a driving element on said shaft, an axially adjustable driven element rotatable on the said shaft, means for rotating the said driven element directly from the said driving element, a transmission element at an angle to the said driving and driven elements and constructed to drive the latter from the former, and means for axially adjusting the said driven element on the said shaft.

2. The combination of a driving shaft, a driving element on said shaft, having a toothed clutch-element, a driven element rotatable on said shaft, having a toothed clutch-element to coöperate with the corresponding clutch-element on the driving element, said driven element being axially adjustable to permit engagement and disengagement of the clutch-elements, means for adjusting said driven element, and a transmission element for engaging the driving and driven elements to drive the latter from the former when the said clutch-elements are disengaged.

3. The combination of a driving shaft, a driving element on the said shaft, an axially adjustable driven element rotatable on the said shaft, means for rotating the driven element directly from the driving element, a transmission element at an angle to the driving and driven elements for engaging the same to drive the latter from the former, means for placing the transmission element into and out of coöperation with the driving and driven elements, and means for axially adjusting the driven element.

4. The combination of a driving shaft, a driving disk turning therewith, a driven disk rotatable on said shaft, means for clutching the said disks together, a transmission disk contacting the driving and driven disks and adapted to drive the driven disk when the same is unclutched from the driving disk.

5. The combination of a driving shaft, a driving disk turning therewith and having a clutch element, a driven disk slidable on said shaft and also having a clutch element, means to slide said driven disk to cause the same clutch elements to clutch the driving and driven disks, a transmission-disk contacting the driving and driven disks to transmit motion from one to the other, and means to move said transmission-disk in and out of operative relation to the driving and driven disks.

6. The combination of a driving shaft, a driving disk turning therewith, a driven disk slidably mounted on said shaft, a transmission-disk contacting the driving and driven disks, to transmit motion from one to the other, and means for sliding the driven disk on the shaft across the face of the transmission-disk.

7. The combination of a driving shaft, a driving disk turning therewith and having a clutch element, a driven disk slidable on said shaft and having a clutch element to co-act with that on the driving disk, a transmission-disk to transmit motion from one to the other, and means to slide the driven disk to place said clutch element in and out of engagement and to move said driven disk across the face of the transmission disk.

8. The combination of a driving shaft, a driving disk turning therewith and having a clutch element, a driven disk slidable on said shaft and having a clutch element to co-act with that on the driving disk, a transmission-disk to transmit motion from one to the other, means to slide the driven disk to place said clutch elements in and out of engagement, and to move said driven disk across the face of the transmission-disk, and a driven shaft and gearing controlled by said driving and driven disks for rotating said shaft.

9. The combination of a driving shaft, a driving disk turning therewith, a driven disk slidably mounted on said shaft, a transmission-disk contacting the driving and driven disks, to transmit motion from one to the other, means for sliding the driven disk on the shaft across the face of the transmission-disk, a driven shaft, a gear rotated by the driving shaft, a second gear rotated by the driven disk, and a gear on the driven shaft disposed between and engaged by both of the other gears.

10. The combination of a driving shaft, a driving disk turning therewith and having a clutch element, a hollow shaft surrounding the driving shaft, a driven disk mounted to slide on said shaft and rotate therewith and also having a clutch element, a transmission-disk contacting said driving and driven disk to transmit motion from one to the other, means to slide the driven disk to place said clutches in and out of engagement and to move said driven disk across the face of the transmission disk, a driven shaft, gears carried respectively by the driving and hollow shafts, and a gear on the driven shaft disposed between and engaged by the gears on the driving and hollow shafts.

11. The combination of a driving shaft, a driving disk turning therewith and having a clutch element, a hollow shaft surrounding the driving shaft, a driven disk mounted to slide on said shaft and rotate therewith and also having a clutch element, a transmission-disk contacting said driving and driven disk to transmit motion from one to the other, means to move the transmission-disk in and out of contact with the driving and driven disks, means to slide the driven disk to place said clutches in and out of engagement and to move said driven disk across the face of the transmission disk, a driven shaft, gears carried respectively by the driving and hollow shafts, and a gear on the driven shaft disposed between and engaged by the gears on the driving and hollow shafts.

12. The combination of a driving shaft, a driving element and a gear on the shaft, a shaft intermediate to said driving element and gear, a driven element and a gear on the second-mentioned shaft, a transmission element for engaging the driving and driven elements to drive the latter from the former, a driven shaft, and gearing carried by the driven shaft and connecting the gear on the driving shaft with the gear on the second-mentioned shaft.

13. The combination of driving and driven elements in axial alinement, one of said elements being axially adjustable toward and from the other, a driving shaft carrying the driving element, a transmission element coöperating with the said elements to drive the driven element from the other, a gear carried by the driving shaft, a gear rotating with the driven element on the same axis, gearing connecting the said gears, and a driven shaft rotated by said gearing.

14. The combination of a driving shaft, a driving element thereon, a tubular shaft rotatable on the driving shaft, a driven element to rotate the tubular shaft and axially adjustable thereon, a transmission element connecting the said elements to drive the driven from the driving element, a gear on the driving shaft, a gear on the tubular shaft, a driven shaft, and planetary gearing carried by the driven shaft to rotate the same and in mesh with both the said gears.

15. The combination of a driving shaft, a gear thereon, a tubular shaft rotatable on the driving shaft, frictional means for driving the second-mentioned shaft from the first, a gear on the second mentioned shaft and adjacent to the first gear, gearing intermediate to the said gears and in mesh with both, and a rotatable support carrying said intermediate gearing.

16. The combination of a driving shaft, a gear thereon, a tubular shaft rotatable on the first shaft, frictional means for actuating the second shaft from the first and at variable speed, a gear on the second shaft and adjacent to the gear on the first shaft, gearing intermediate to the said gears and in mesh with both, and a rotatable support carrying the said intermediate gearing.

17. The combination of two shafts, one tubular and rotatable on the other, frictional means for driving one of the shafts from the other, gears on the respective shafts, gearing intermediate to the said gears, and a rotatable carrier for said gearing.

18. The combination of two shafts, one tubular and rotatable on the other, frictional means for driving one of the shafts from the other and at variable speed, means for positively connecting the shafts at will to rotate one from the other without the instrumentality of said frictional means, gears on the respective shafts, gearing intermediate to the said gears, and a rotatable carrier for the intermediate gearing.

HERMAN CASLER.

Witnesses:
M. LAWSON DYER,
S. S. DUNHAM.